Sept. 19, 1950     J. L. TARBUTTON     2,523,238
BALL BEARING
Filed Nov. 27, 1945
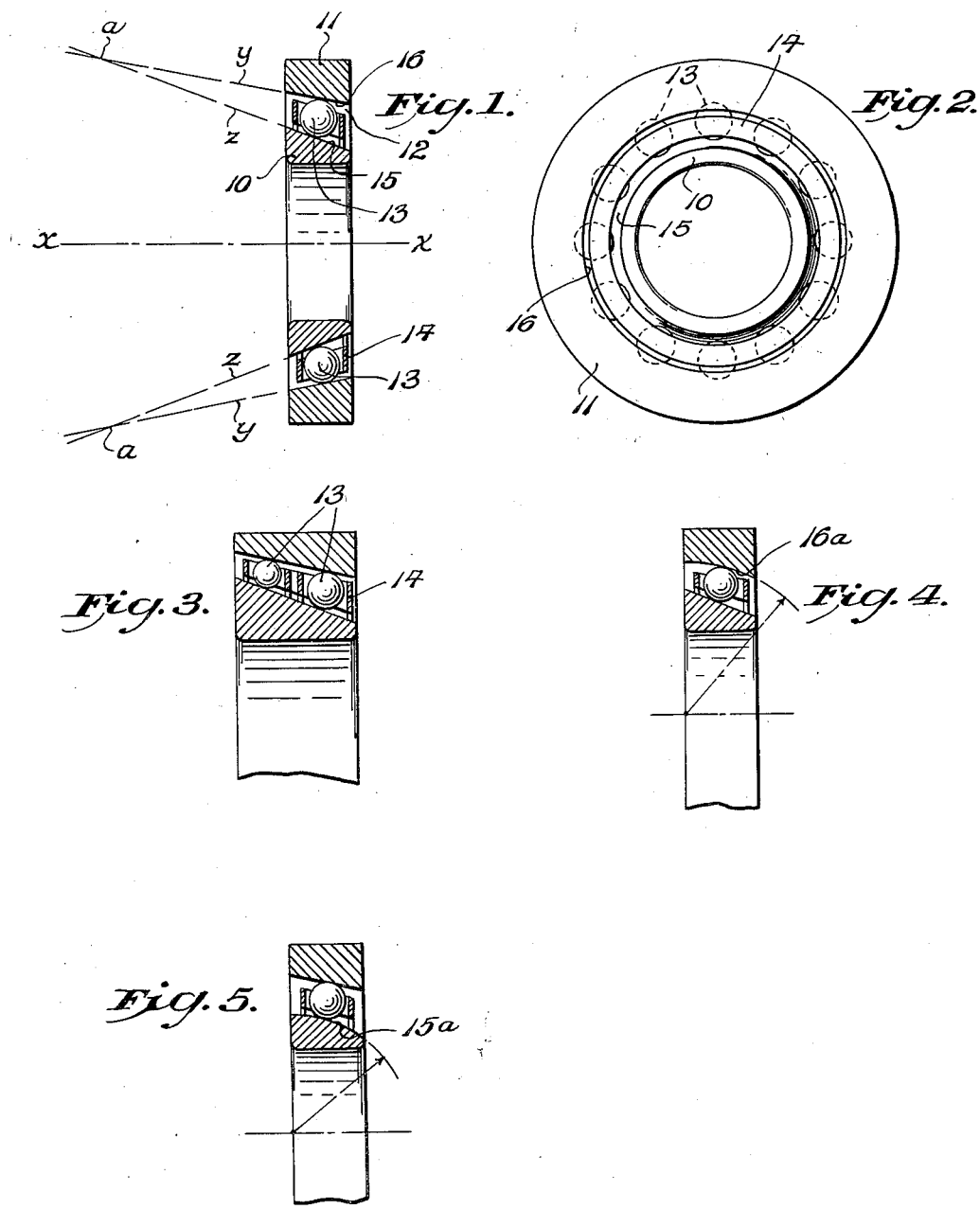
INVENTOR.
J. L. Tarbutton
BY Patented Sept. 19, 1950

2,523,238

UNITED STATES PATENT OFFICE 2,523,238

BALL BEARING

James L. Tarbutton, Columbus, Ohio, assignor to Granville G. Prior, Columbus, Ohio Application November 27, 1945, Serial No. 631,047

3 Claims. (Cl. 308—193)

This invention relates to antifriction bearings and, more particularly, to bearings of the type wherein accommodation is provided to reduce both rotary friction and the friction resulting from end thrust.

It is an object of the invention to provide a ball bearing composed of inner and outer race members arranged in concentric relationship in the same plane, with the outer surfaces of the inner race members spaced from the inner surfaces of the outer member, whereby to provide an annular space between said race members for the reception of cage-confined ball elements, and wherein the ball-engaging surfaces of said race members are disposed in annular relation with respect to each other and with respect to the principal longitudinal axis of the bearing, whereby, when the bearing is rotated rapidly, forces will be applied thereto causing the ball elements to engage uniformly with the bearing surfaces provided therefor on the inner and outer race members, in order to compensate automatically for wear and inequalities in expansion or contraction of related parts.

Another object of the invention is to provide a bearing of the above mentioned character, which is simple in construction, economical to manufacture, strong and durable.

Other objects and advantages of the invention will be apparent during the course of the following description.

In the accompanying drawings, forming a part of this specification, and in which like numerals are employed to designate like parts throughout the same:

Fig. 1 is a vertical longitudinal sectional view taken through an antifriction bearing formed in accordance with the present invention;

Fig. 2 is a front elevational view thereof;

Fig. 3 is a fragmentary vertical longitudinal sectional view taken through a modified form of my improved bearing and disclosing the employment of ball elements arranged in a plurality of annular rows;

Fig. 4 is a similar view of another modification in which the bearing surface of the outer race member possesses an arcuate curvature;

Fig. 5 is a similar view disclosing the inner race member having an arcuate curvature.

Referring more particularly to the drawings, the numeral 10 designates the inner race member or cone of my improved ball bearing, while the numeral 11 designates the outer race member or ring of the bearing. As usual, these members are disposed in concentric relationship and occupy the same planes. When so positioned, the outside diameter of the inner race member is such as to provide an annular space 12 between said members. Positioned in this space is a circular series of ball elements 13, the latter being retained in definitely spaced operating positions by the provision of the retainer cage 14 of any suitable construction.

One of the outstanding features of the present invention consists in forming the outer peripheral surface 15 of the inner race member 10 so that it is disposed at an acute angle with respect to the longitudinal axis $x$—$x$ of the bearing, the surface 15 being devoid of the usual annular ball-receiving grooves found in conventional bearings. Thus the surface 15 may be defined as being plain, smooth and uninterrupted.

A similar surface 16 is formed upon the inner side of the outer race member 11 for engagement with the ball elements 13. The angularity, however, of the surface 16, as shown by the dotted lines $y$—$y$ in Fig. 1 is somewhat less with respect to the axis $x$—$x$ than the angularity of the surface 15, as will be apparent by reference to the dotted lines $z$—$z$, Fig. 1. It will be noted that the projected lines $y$—$y$ and $z$—$z$ converge at the points $a$—$a$. By reason of the differences in angularity of the surfaces 15 and 16, the annular space 12 at one side of the bearing possesses a greater width than that which exists on the opposite side of the bearing.

A bearing so constructed is adapted to be used under conditions where centrifugal force, caused by the rotation of either race member, will cause the ball elements to roll toward that portion of the outer race member possessing the largest outside diameter, or toward the left as the structure is viewed in Fig. 1. In so doing, the ball elements will reach a point where they make uniform contact with the bearing surface 15 of the inner race member. A slight difference in ball diameter will be compensated for automatically with this arrangement, as well as compensating for wear and inequalities in expansion or contraction of related parts. It will be understood that when the bearing is operatively mounted in connection with associated machine parts, the inner and outer race members thereof are held against relative longitudinal displacement.

A variation of my invention has been disclosed in Fig. 3 wherein the retaining cage 14 positions in spaced relation a pair of circularly arranged rows of the ball elements 13. Also, in Fig. 4, the surface 16a of the outer race member is somewhat arcuate in form instead of being straight, as in Fig. 1, and in Fig. 5 another alternative form is presented in which the surface 15a of the inner race member is indicated as being arcuate.

From the foregoing, it will be seen that through the use of the construction set forth, the efficiency of operation of ball-type antifriction bearings is increased, and the cost thereof reduced, such advantages being present without sacrificing strength and durability.

While I have set forth certain preferred embodiments of my invention, nevertheless, I reserve the right to modify the same within the limits prescribed by the following claims.

I claim:

1. In a ball bearing, an inner race member, an outer race member surrounding said inner race member in concentric relation thereto, said members being relatively disposed to provide an annular ball-receiving space therebetween, a circular series of ball elements disposed in said space, and retaining means for holding said ball elements in spaced order relative to each other, the surfaces of said race members contacting the ball elements possessing a smooth frusto-conical form and being devoid of recesses to permit said ball elements to move laterally of the space in response to rotational forces created by the rotation of either of said race members, and the said ball element contacting surfaces of said race members possessing a progressive taper so that the space on the side of said bearing at which said surfaces possess maximum diameter is of reduced width as compared with that on the opposite side of the bearing.

2. In a ball bearing, an inner race member having an annular outer bearing surface of frusto-conical formation, an outer race member having an inner annular bearing surface of frusto-conical formation but tapering at a different angle from that of the bearing surface on the inner race member, said race members being disposed in concentric relationship and in the same planes whereby to provide between the bearing surfaces thereof an annular space which possesses greater width on one side of the bearing than on its other, a plurality of ball elements positioned for movement in said space in contact with the bearing surfaces of said race members, said ball elements being free to move from one side of said space toward the other when one of said race members is rapidly rotated, the space between the bearing surfaces of said race members being of minimum width at the greatest diameters of said surfaces.

3. In a ball bearing, an inner race member having an annular outer bearing surface, an outer race member having an annular inner bearing surface disposed at an angle different from that of the bearing surface on the inner race member, said race members being disposed in concentric relationship and in the same planes whereby to provide between the bearing surfaces thereof an annular space which possesses greater width on one side of the bearing than on its other, a plurality of ball elements positioned for movement in said space in contact with the bearing surfaces of said race members, said ball elements being free to move to a limited extent from one side of said space toward the other until such movement is arrested by the convergence of said bearing surfaces, the space between the bearing surfaces of said race members being of minimum width at the greatest diameters of said surfaces.

JAMES L. TARBUTTON.

REFERENCES CITED

The following references are of record in the file of this patent:

UNITED STATES PATENTS

| Number | Name | Date |
|--------|------|------|
| 1,645,345 | Okner | Oct. 11, 1927 |
| 1,671,372 | Leedham | May 29, 1928 |
| 2,057,391 | Munson | Oct. 13, 1936 |